US011860709B2

United States Patent
Wang et al.

(10) Patent No.: US 11,860,709 B2
(45) Date of Patent: Jan. 2, 2024

(54) POWER SUPPLY APPARATUS AND METHOD HAVING POWER LIMITING MECHANISM

(71) Applicant: REALTEK SEMICONDUCTOR CORPORATION, Hsinchu (TW)

(72) Inventors: Rui Wang, Suzhou (CN); Min Zhang, Suzhou (CN); He Li, Suzhou (CN); Qi-Cai Tang, Suzhou (CN); Teng-Yue Zhang, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 23 days.

(21) Appl. No.: 17/844,779

(22) Filed: Jun. 21, 2022

(65) Prior Publication Data

US 2023/0132775 A1   May 4, 2023

(30) Foreign Application Priority Data

Nov. 2, 2021 (CN) .......................... 202111285556.6

(51) Int. Cl.
| | |
|---|---|
| *G06F 1/3296* | (2019.01) |
| *G06F 1/3212* | (2019.01) |
| *G06F 1/3203* | (2019.01) |
| *G06F 1/26* | (2006.01) |
| *G06F 1/18* | (2006.01) |

(52) U.S. Cl.
CPC .......... *G06F 1/3296* (2013.01); *G06F 1/3212* (2013.01); *G06F 1/189* (2013.01); *G06F 1/26* (2013.01); *G06F 1/266* (2013.01); *G06F 1/3203* (2013.01)

(58) Field of Classification Search
CPC ........ G06F 1/26; G06F 1/3203; G06F 1/3296; G06F 1/266; G06F 1/3212; G06F 1/189
USPC ................. 713/300, 320; 323/234; 361/93.9; 700/292
See application file for complete search history.

(56) References Cited

U.S. PATENT DOCUMENTS

| | | | |
|---|---|---|---|
| 7,639,469 B2 * | 12/2009 | Heath ...................... | H04L 12/10 361/18 |
| 10,609,797 B1 * | 3/2020 | Jonsson ................. | H05B 45/14 |

(Continued)

*Primary Examiner* — Ji H Bae
(74) *Attorney, Agent, or Firm* — WPAT, P.C.

(57) ABSTRACT

The present invention discloses a power supply apparatus having power limiting mechanism. A switch transistor is controlled by a control voltage such that a power supply unit supplies a power to a powered device when the switch transistor is controlled to be conducted, wherein the switch transistor has an operation current, an operation voltage and an operation power under conduction. A voltage detection circuit detects the operation voltage. A power-limiting circuit performs analog-to-digital conversion on the operation voltage, generates a current-limiting signal related to a current-limiting value according to the operation voltage based on a predetermined voltage-current curve and performs digital-to-analog conversion on the current-limiting signal to generate a reference voltage. A current-limiting circuit receives the reference voltage and a feedback voltage generated according to the operation current to perform comparison and generate the control voltage accordingly to control the switch transistor to keep the operation current at the current-limiting value.

10 Claims, 4 Drawing Sheets

(56) References Cited

U.S. PATENT DOCUMENTS

| | | | |
|---|---|---|---|
| 2006/0164769 A1* | 7/2006 | Stanford | H04L 49/351 361/87 |
| 2006/0164774 A1* | 7/2006 | Herbold | H04L 12/10 361/93.1 |
| 2007/0121929 A1* | 5/2007 | Korcharz | G06F 1/26 379/413 |
| 2008/0164884 A1* | 7/2008 | Hussain | H04L 12/10 324/522 |
| 2020/0088770 A1* | 3/2020 | Hastings | G01R 15/08 |

* cited by examiner

POWER SUPPLY APPARATUS AND METHOD HAVING POWER LIMITING MECHANISM

BACKGROUND OF THE INVENTION

1. Field of the Invention

The present invention relates to a power supply apparatus and a power supply method having power limiting mechanism.

2. Description of Related Art

Power over Ethernet (PoE) is a technology using network connections to transfer power to powered device. In conventional design, an electronic device requires different connections to access network and power simultaneously. Power over Ethernet technology allows a single network connection for the electronic device to supply power through the network connector to the electronic device.

When Power over Ethernet technology is used, a switch transistor is required to drive the switch that allows the power supply device to supply power to the powered device. The power of the switch transistor needs to be limited under a certain value. However, conventional power-limiting technologies are difficult to provide an accurate control mechanism. Furthermore, when a current of the switch transistor is too large such that a current-limiting operation is required, the operation that lowers the conduction degree of the switch transistor in order to lower the current results in the raise of the on-resistance (Ron) of the switch transistor. The power of the switch transistor cannot be lowered.

SUMMARY OF THE INVENTION

In consideration of the problem of the prior art, an object of the present invention is to supply a power supply apparatus and a power supply method having power limiting mechanism.

The present invention discloses a power supply apparatus having power limiting mechanism that includes a switch transistor, a voltage detection circuit, a power-limiting circuit and a current-limiting circuit. The switch transistor is electrically coupled in series with a powered device and is controlled by a control voltage to form a conduction path when being conducted such that a power supply unit supplies a power to the powered device, wherein the switch transistor has an operation current, an operation voltage and an operation power when being conducted. The voltage detection circuit is configured to detect the operation voltage. The power-limiting circuit includes an analog-to-digital conversion circuit, a calculation circuit and a digital-to-analog conversion circuit. The analog-to-digital conversion circuit is configured to perform analog-to-digital conversion on the operation voltage. The calculation circuit is configured to generate a current-limiting signal related to a current-limiting value according to the operation voltage based on a predetermined voltage-current curve, wherein the predetermined voltage-current curve limits the operation power to be not larger than a predetermined value. The digital-to-analog conversion circuit is configured to perform digital-to-analog conversion on the current-limiting signal to generate a reference voltage. The current-limiting circuit is configured to receive the reference voltage and perform comparison with a feedback voltage generated according to the operation current to generate the control voltage accordingly to control the switch transistor, so as to keep the operation current at the current-limiting value.

The present invention also discloses a power supply method having power limiting mechanism used in a power supply apparatus that includes steps outlined below. A switch transistor electrically coupled in series with a powered device is controlled by a control voltage to form a conduction path when being conducted such that a power supply unit supplies a power to the powered device, wherein the switch transistor has an operation current, an operation voltage and an operation power when being conducted. The operation voltage is detected by a voltage detection circuit. Analog-to-digital conversion is performed on the operation voltage by an analog-to-digital conversion circuit of a power-limiting circuit. A current-limiting signal related to a current-limiting value is generated by a calculation circuit of the power-limiting circuit according to the operation voltage based on a predetermined voltage-current curve, wherein the predetermined voltage-current curve limits the operation power to be not larger than a predetermined value. Digital-to-analog conversion is performed on the current-limiting signal to generate a reference voltage by a digital-to-analog conversion circuit of the power-limiting circuit. The reference voltage is received and comparison is performed with a feedback voltage generated according to the operation current by a current-limiting circuit to generate the control voltage accordingly to control the switch transistor, so as to keep the operation current at the current-limiting value.

These and other objectives of the present invention will no doubt become obvious to those of ordinary skill in the art behind reading the following detailed description of the preferred embodiments that are illustrated in the various figures and drawings.

DETAILED DESCRIPTION OF THE PREFERRED EMBODIMENTS

An aspect of the present invention is to provide a power supply apparatus and a power supply method having power limiting mechanism to generate a current-limiting signal according to an operation voltage based on a predetermined voltage-current curve and control a conduction state of a switch transistor accordingly, such that the operation current thereof is kept at a current-limiting value to obtain an accurate power-limiting mechanism.

Figure 1:
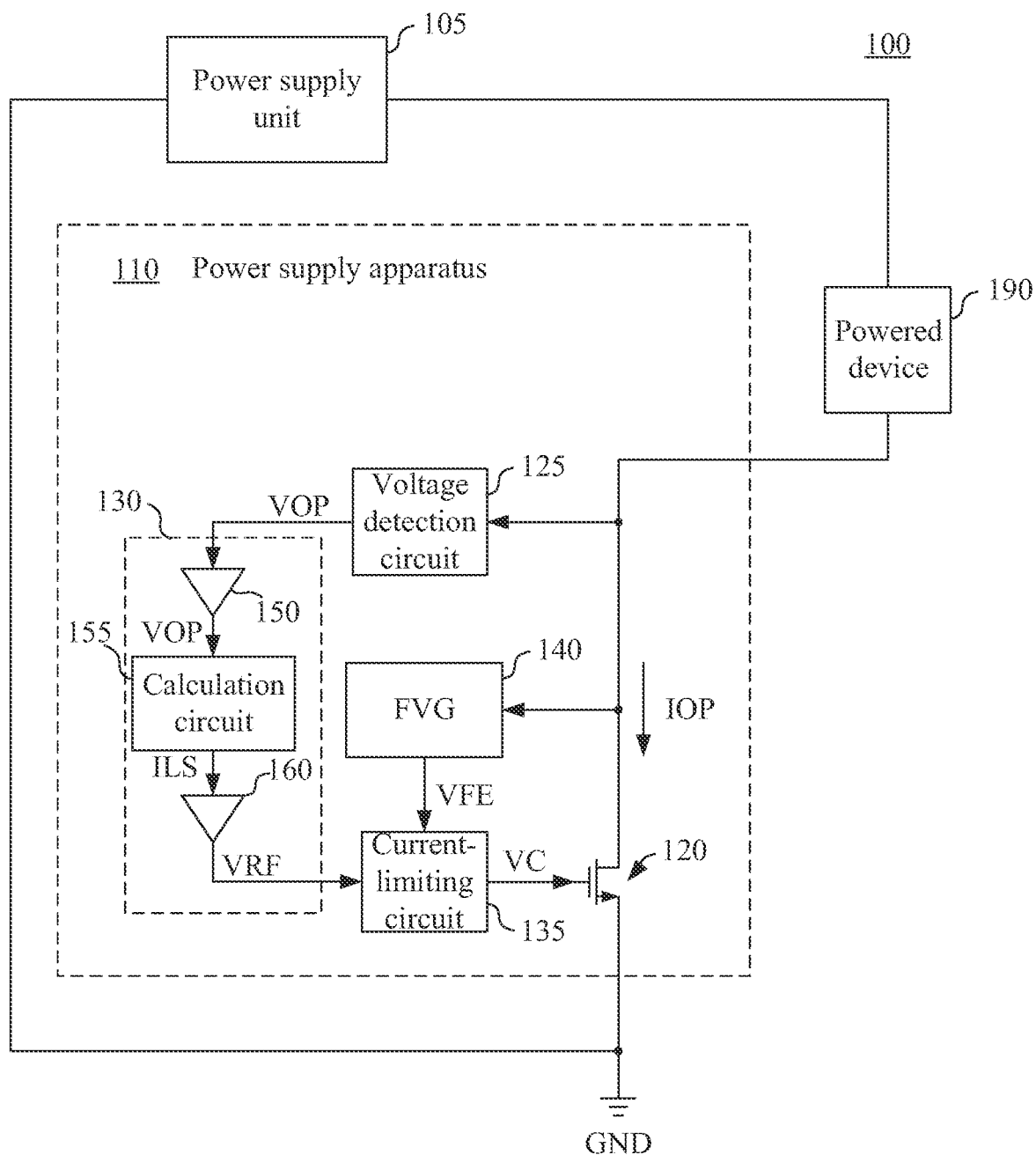
FIG. 1 illustrates a block diagram of a power system according to an embodiment of the present invention.

Reference is now made to FIG. 1. FIG. 1 is a block diagram of a power system 100 according to an embodiment of the present invention. The power system 100 is configured to supply power to a powered device 190. The power system 100 includes a power supply unit 105 and a power supply apparatus 110 having power limiting mechanism.

The power supply unit (PSU) 105 is a power supply device configured to supply a power of such as, but not limited to 57 volts or 48 volts. The power supply apparatus 110 includes a switch transistor 120, a voltage detection circuit 125, a power-limiting circuit 130, a current-limiting circuit 135 and a feedback voltage generation circuit 140 (abbreviated as FVG in FIG. 1).

The power supply unit 105 is electrically coupled to the powered device 190 to supply power to the powered device 190. The switch transistor 120 is electrically coupled in series with the powered device 190 and is controlled by a control voltage VC to form a conduction path when being conducted such that the power supply unit 105 supplies the power to the powered device 190.

In an embodiment, the power is transmitted between the power system 100 and the powered device 190 according to Power over Ethernet (PoE) technology. As a result, when the power is transmitted, the power supply apparatus 110 operates as a power sourcing equipment (PSE) and the powered device 190 operates as a powered device (PD).

In an embodiment, the switch transistor 120 is an N-type transistor having a drain, a source and a gate. The drain is electrically coupled to the powered device 190. The source is electrically coupled to a ground terminal GND. The gate receives the control voltage VC. The switch transistor 120, when being conducted, has an operation current IOP, an operation voltage VOP (the cross voltage between the drain and the source) and an operation power (not illustrated in the figure).

The voltage detection circuit 125 is configured to detect the operation voltage VOP. It is appreciated that in FIG. 1, the voltage detection circuit 125 is illustrated to be only electrically coupled to the drain of the switch transistor 120. However, in order to detect the cross voltage between the drain and the source of the switch transistor 120, the voltage detection circuit 125 can actually be electrically coupled to both the drain and the source of the switch transistor 120.

The power-limiting circuit 130 includes an analog-to-digital conversion circuit 150, a calculation circuit 155 and a digital-to-analog conversion circuit 160.

The analog-to-digital conversion circuit 150 is configured to perform analog-to-digital conversion on operation voltage VOP.

The calculation circuit 155 is configured to generate a current-limiting signal ILS related to a current-limiting value according to the operation voltage VOP after the analog-to-digital conversion based on a predetermined voltage-current curve. The predetermined voltage-current curve sets the operation voltage and the current-limiting value to be inversely proportional such that the operation power of the switch transistor 120 is limited to be not larger than a predetermined value.

Figure 2A:
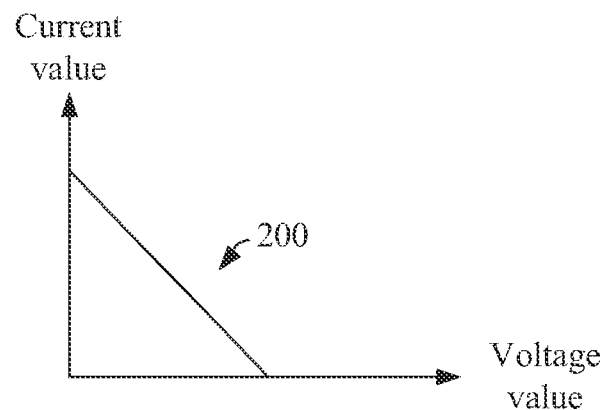
FIG. 2A illustrates a diagram of a predetermined voltage-current curve according to an embodiment of the present invention.

Reference is now made to FIG. 2A at the same time. FIG. 2A illustrates a diagram of a predetermined voltage-current curve 200 according to an embodiment of the present invention. The x-axis corresponds to voltage values and the y-axis corresponds to current values.

In the present embodiment, the predetermined voltage-current curve 200 is a straight line and is expressed as $Y=aX+b$, wherein X and Y are positive numbers, a represents a predetermined negative coefficient and b represents a predetermined positive coefficient. In an actual numerical example, the predetermined voltage-current curve 200 can be $Y=-X+5$.

Under such a condition, since the power is the product of the voltage value and the current value, the power can be expressed as $X(aX+b)$. Such a power corresponding to a curve of second order has a maximum value. As a result, the calculation circuit 155 can calculate the required current-limiting value according to the operation voltage VOP based on the predetermined voltage-current curve 200 to generate the current-limiting signal ILS related to the current-limiting value that guarantees the operation power of the switch transistor 120 to be not larger than the maximum value of such a curve.

Figure 2B:
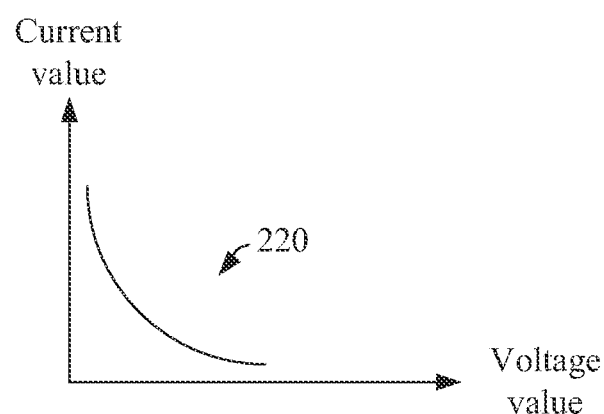
FIG. 2B illustrates a diagram of a predetermined voltage-current curve according to an embodiment of the present invention.

Reference is now made to FIG. 2B at the same time. FIG. 2B illustrates a diagram of a predetermined voltage-current curve 200 according to an embodiment of the present invention. The x-axis corresponds to voltage values and the y-axis corresponds to current values.

In the present embodiment, the predetermined voltage-current curve 210 is an inverse proportional curve and is expressed as $XY=c$, wherein X and Y are positive number and c represents a predetermined positive coefficient. In an actual numerical example, the predetermined voltage-current curve 200 can be $XY=10$.

Under such a condition, since the power is the product of the voltage value and the current value, the power can be expressed as c. As a result, the calculation circuit 155 can calculate the required current-limiting value according to the operation voltage VOP based on the predetermined voltage-current curve 200 to generate the current-limiting signal ILS related to the current-limiting value that guarantees the operation power of the switch transistor 120 to be not larger than the coefficient c.

It is appreciated that the predetermined voltage-current curves described above are merely an example. In other embodiments, other curves can be used to accomplish the object to keep the operation power from being larger than the predetermined value.

The digital-to-analog conversion circuit 160 is configured to perform digital-to-analog conversion on the current-limiting signal ILS to generate a reference voltage VRF.

The current-limiting circuit 135 is configured to receive the reference voltage VRF and perform comparison with a feedback voltage VFE generated according to the operation current IOP to generate the control voltage VC accordingly to control the switch transistor 120, so as to keep the operation current IOP at the current-limiting value. The feedback voltage VFE is generated by the feedback voltage generation circuit 140.

Figure 3:
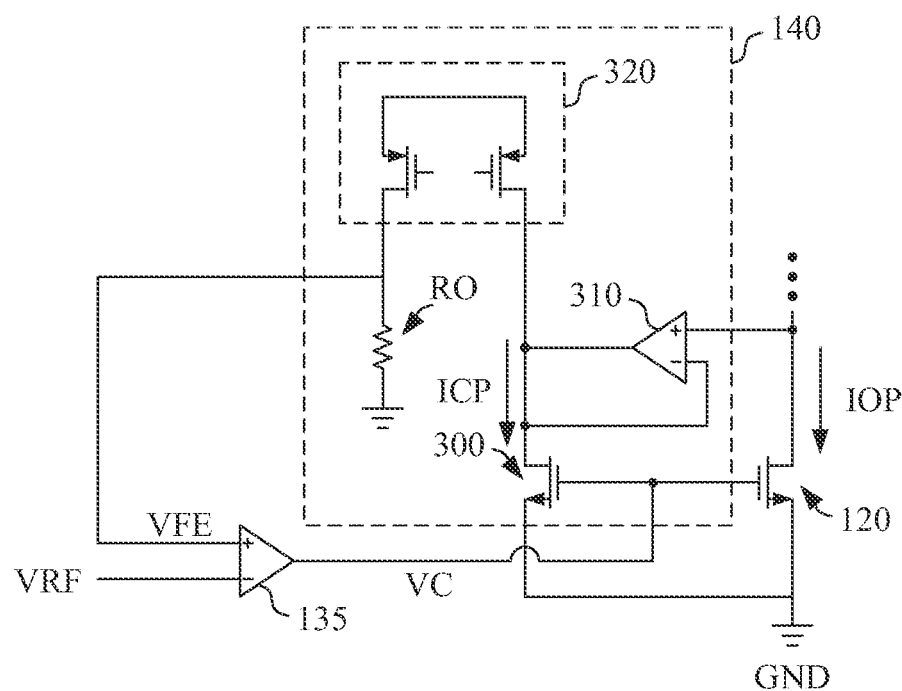
FIG. 3 illustrates a circuit diagram of the switch transistor, the current-limiting circuit and the feedback voltage generation circuit according to an embodiment of the present invention according to an embodiment of the present invention.

Reference is now made to FIG. 3. FIG. 3 illustrates a circuit diagram of the switch transistor 120, the current-limiting circuit 135 and the feedback voltage generation circuit 140 according to an embodiment of the present invention. The feedback voltage generation circuit 140 includes a control transistor 300, a comparator 310 and a current mirror 320.

In an embodiment, the control transistor 300 is an N-type transistor having a drain, a source and a gate. The drain is electrically coupled to the comparator 310 and the current mirror 320. The source is electrically coupled to the source of the switch transistor 120. The gate receives the control voltage VC. The switch transistor 120, when being conducted, has a control current ICP.

The comparator 310 has two input terminals and an output terminal. The two input terminals are respectively electrically coupled to the drain of the switch transistor 120 and the drain of the control transistor 300. The output terminal is electrically coupled to the drain of the control transistor 300. By using a feedback mechanism to compare the voltages at the drains of the switch transistor 120 and the control transistor 300 to keep the voltages at the drains equal, the comparator 310 can make the control current ICP and the operation current IOP have a fixed ratio therebetween. Such a fixed ratio is related to the channel sizes (e.g., W/L ratio) of the switch transistor 120 and the control transistor 300. In an embodiment, when the switch transistor 120 and the control transistor 300 have the same channel size, the control current ICP and the operation current IOP are the same.

The current mirror 320 has a first current output terminal and a second current output terminal respectively electrically coupled to the drain of the control transistor 300 and an output resistor RO, so as to mirror the control current ICP to the output resistor RO and generate the feedback voltage VFE at the second current output terminal.

In an embodiment, the current-limiting circuit 135 can be a comparator and is configured to receive the feedback voltage VFE and the reference voltage VRF to perform comparison and output the control voltage VC according to the comparison result to the gate of each of the switch transistor 120 and the control transistor 300.

By using the feedback mechanism described above, the current-limiting circuit 135 adjusts the amount of the control voltage VC, when the operation current IOP is either larger than or smaller than the current-limiting value, according to the comparison result of the feedback voltage VFE and the reference voltage VRF. The conduction degree of the switch transistor 120 can therefore be adjusted to keep the operation current IOP at the current-limiting value such that the operation power of the switch transistor 120 is not larger than the predetermined value.

It is appreciated that the configuration of the feedback voltage generation circuit 140 described above is merely an example. In other embodiments, other configurations can be used to generate the feedback voltage VFE according to the operation current IOP.

In some approaches, the power-limiting mechanism of the switch transistor is accomplished by using fully analog comparator. Under such a condition, the accuracy and the consistency between the voltage value and the current-limiting value cannot be controlled accurately. Further, only a linear adjusting approach can be used such that under the condition the current of the switch transistor is too large and is required to be limited, the drop of the conduction degree of the switch transistor causes the raise of the on-resistance (Ron) of the switch transistor. The power thereof cannot be decreased. The power-limiting is hard to implement when an elastic selection of an appropriate curve is not able to be performed to control the power.

The power supply apparatus of the present invention can convert the operation voltage to a digital form and perform digital control according to a predetermined voltage-current curve to generate the current-limiting signal, in which such a curve can (but not limited to) make the current and the voltage inversely proportional. The current-limiting signal is further converted to an analog form to control the conduction state of the switch transistor to keep the operation current thereof at the current-limiting value. An accurate power-limiting mechanism can be accomplished.

In an embodiment, the analog-to-digital conversion circuit 150 and the digital-to-analog conversion circuit 160 in FIG. 1 can be selectively shared with other circuits that cooperate with the switch transistor 120. For example, the analog-to-digital conversion circuit 150 can be shared with a storage circuit (not illustrated in the figure) configured to store the operation voltage VOP, in which such a storage circuit can be accessed by other circuits to perform other calculations and processing according to the operation voltage VOP. The digital-to-analog conversion circuit 160 can be shared with an over-current protection (OCP) circuit (not illustrated in the figure). By using such a configuration, the power supply apparatus 110 can make more efficient usage of the circuit area.

Figure 4:
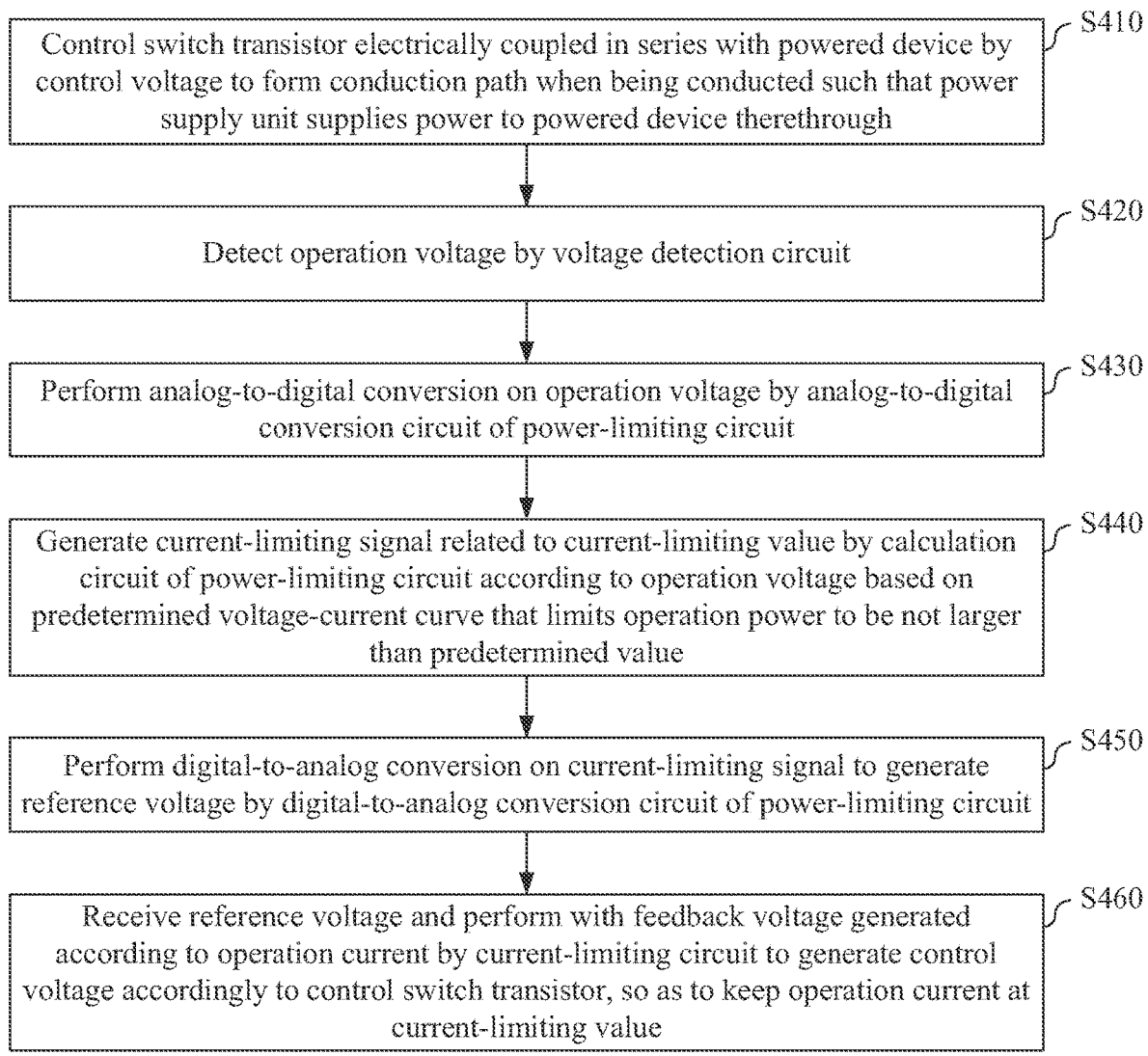
FIG. 4 illustrates a flow chart of a power supply method according to an embodiment of the present invention.

Reference is now made to FIG. 4. FIG. 4 illustrates a flow chart of a power supply method 400 according to an embodiment of the present invention.

In addition to the apparatus described above, the present disclosure further provides the power supply method 400 that can be used in such as, but not limited to, the power supply apparatus 110 in FIG. 1. As illustrated in FIG. 4, an embodiment of the power supply method 400 includes the following steps.

In step S410, the switch transistor 120 electrically coupled in series with the powered device 190 is controlled by the control voltage to form the conduction path when being conducted such that the power supply unit 105 supplies the power to the powered device 190, wherein the switch transistor 120 has the operation current IOP, the operation voltage VOP and the operation power when being conducted.

In step S420, the operation voltage VOP is detected by the voltage detection circuit 125.

In step S430, analog-to-digital conversion is performed on the operation voltage VOP by the analog-to-digital conversion circuit 150 of the power-limiting circuit 130.

In step S440, the current-limiting signal ILS related to the current-limiting value is generated by the calculation circuit 155 of the power-limiting circuit 130 according to the operation voltage VOP based on the predetermined voltage-current curve, wherein the predetermined voltage-current curve limits the operation power to be not larger than a predetermined value.

In step S450, digital-to-analog conversion is performed on the current-limiting signal ILS to generate the reference voltage VRF by the digital-to-analog conversion circuit 160 of the power-limiting circuit 130.

In step S460, the reference voltage VRF is received and comparison is performed with the feedback voltage VFE generated according to the operation current IOP by the current-limiting circuit 135 to generate the control voltage VC accordingly to control the switch transistor 120, so as to keep the operation current IOP at the current-limiting value.

It is appreciated that the embodiments described above are merely an example. In other embodiments, it should be appreciated that many modifications and changes may be made by those of ordinary skill in the art without departing, from the spirit of the disclosure.

In summary, the present invention discloses the power supply apparatus and the power supply method having power limiting mechanism to convert the operation voltage to a digital form and perform digital control according to a predetermined voltage-current curve to generate the current-limiting signal. The current-limiting signal is further converted to an analog form to control the conduction state of the switch transistor to keep the operation current thereof at the current-limiting value. An accurate power-limiting mechanism can be accomplished.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A power supply apparatus having power limiting mechanism, comprising:
   a switch transistor electrically coupled in series with a powered device and controlled by a control voltage to form a conduction path when being conducted such that a power supply unit supplies a power to the powered device, wherein the switch transistor has an operation current, an operation voltage and an operation power when being conducted;
   a voltage detection circuit configured to detect the operation voltage;
   a power-limiting circuit comprising:
      an analog-to-digital conversion circuit configured to perform analog-to-digital conversion on the operation voltage;
      a calculation circuit configured to generate a current-limiting signal related to a current-limiting value according to the operation voltage based on a predetermined voltage-current curve, wherein the predetermined voltage-current curve limits the operation power to be not larger than a predetermined value; and
      a digital-to-analog conversion circuit configured to perform digital-to-analog conversion on the current-limiting signal to generate a reference voltage; and
   a current-limiting circuit configured to receive the reference voltage and perform comparison with a feedback voltage generated according to the operation current to generate the control voltage accordingly to control the switch transistor, so as to keep the operation current at the current-limiting value.

2. The power supply apparatus of claim 1, wherein the predetermined voltage-current curve sets the operation voltage and the current-limiting value to be inversely proportional.

3. The power supply apparatus of claim 1, wherein the operation voltage is X, the current-limiting value is Y, and the predetermined voltage-current curve is Y=aX+b or XY=c, wherein X and Y are positive numbers, a represents a predetermined negative coefficient, b represents a predetermined positive coefficient and c represents another predetermined positive coefficient.

4. The power supply apparatus of claim 1, further comprising a feedback voltage generation circuit, comprising:
   a control transistor having a control current when being conducted;
   a comparator having two input terminals and an output terminal, the two input terminals being respectively electrically coupled to a drain of the switch transistor and a drain of the control transistor, the output terminal being electrically coupled to the drain of the control transistor, such that the control current and the operation current have a fixed ratio therebetween; and
   a current mirror having a first current output terminal and a second current output terminal respectively electrically coupled to the drain of the control transistor and an output resistor, so as to mirror the control current to the output resistor and generate the feedback voltage at the second current output terminal.

5. The power supply apparatus of claim 4, wherein the current-limiting circuit receives the feedback voltage and the reference voltage and performs comparison thereon to output the control voltage to a gate of each of the switch transistor and the control transistor.

6. A power supply method having power limiting mechanism used in a power supply apparatus, comprising:
   controlling a switch transistor electrically coupled in series with a powered device by a control voltage to form a conduction path when being conducted such that a power supply unit supplies a power to the powered device, wherein the switch transistor has an operation current, an operation voltage and an operation power when being conducted;
   detecting the operation voltage by a voltage detection circuit;
   performing analog-to-digital conversion on the operation voltage by an analog-to-digital conversion circuit of a power-limiting circuit;
   generating a current-limiting signal related to a current-limiting value by a calculation circuit of the power-limiting circuit according to the operation voltage based on a predetermined voltage-current curve, wherein the predetermined voltage-current curve limits the operation power to be not larger than a predetermined value;
   performing digital-to-analog conversion on the current-limiting signal to generate a reference voltage by a digital-to-analog conversion circuit of the power-limiting circuit; and
   receiving the reference voltage and performing comparison with a feedback voltage generated according to the operation current by a current-limiting circuit to generate the control voltage accordingly to control the switch transistor, so as to keep the operation current at the current-limiting value.

7. The power supply method of claim 6, wherein the predetermined voltage-current curve sets the operation voltage and the current-limiting value to be inversely proportional.

8. The power supply method of claim 6, wherein the operation voltage is X, the current-limiting value is Y, and the predetermined voltage-current curve is Y=aX+b or XY=c, wherein X and Y are positive numbers, a represents a predetermined negative coefficient, b represents a predetermined positive coefficient and c represents another predetermined positive coefficient.

9. The power supply method of claim 6, further comprising:
   controlling a control transistor of a feedback voltage generation circuit to have a control current when being conducted;
   respectively electrically coupling two input terminals of a comparator of the feedback voltage generation circuit to a drain of the switch transistor and a drain of the control transistor, and electrically coupling an output terminal of the comparator to the drain of the control transistor, such that the control current and the operation current have a fixed ratio therebetween; and
   respectively electrically coupling a first current output terminal and a second current output terminal of a current mirror of the feedback voltage generation circuit to the drain of the control transistor and an output resistor, so as to mirror the control current to the output resistor and generate the feedback voltage at the second current output terminal.

10. The power supply method of claim 9, further comprising:
   receiving the feedback voltage and the reference voltage and performing comparison thereon by the current-limiting circuit to output the control voltage to a gate of each of the switch transistor and the control transistor.

\* \* \* \* \*